Jan. 21, 1964  R. P. WITT  3,118,656
LIGHTWEIGHT CEMENTITIOUS MATERIALS
Filed Nov. 6, 1961  3 Sheets-Sheet 1

INVENTOR.
R. P. WITT
BY Richards & Geier
ATTORNEYS

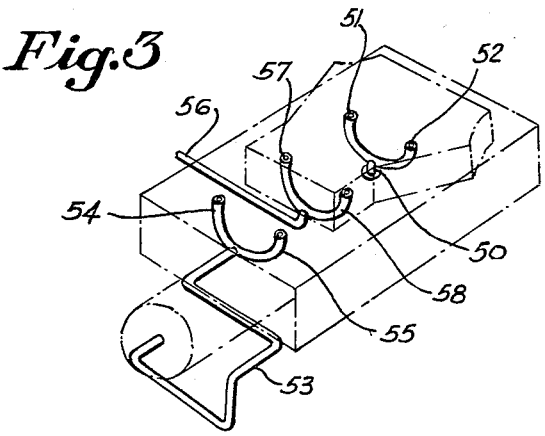
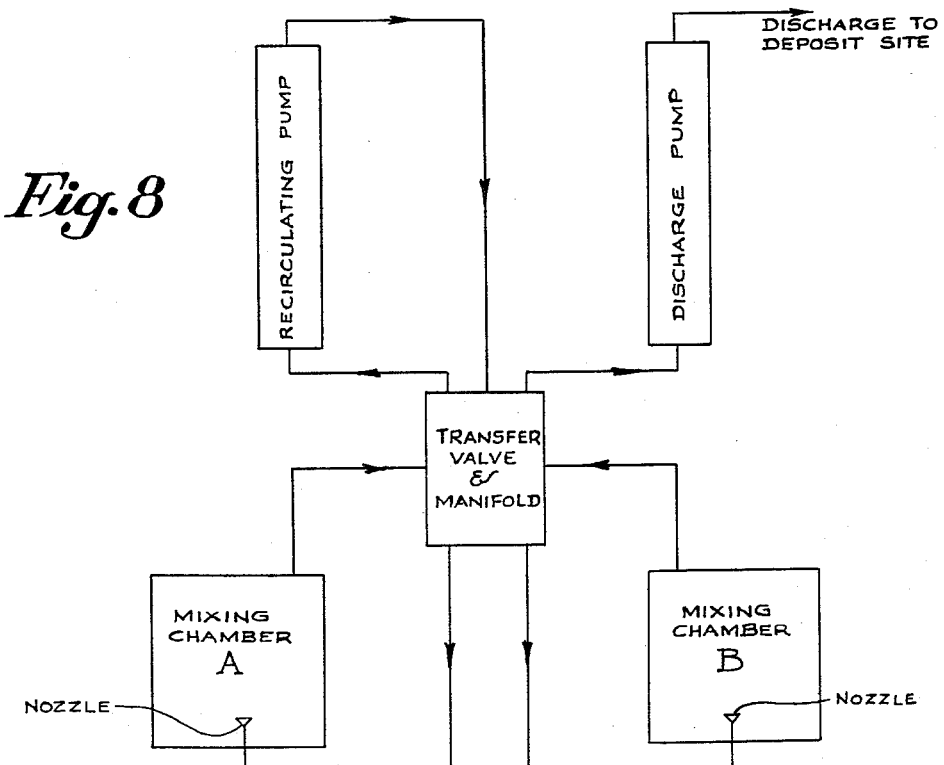

Jan. 21, 1964 R. P. WITT 3,118,656
LIGHTWEIGHT CEMENTITIOUS MATERIALS
Filed Nov. 6, 1961 3 Sheets-Sheet 3
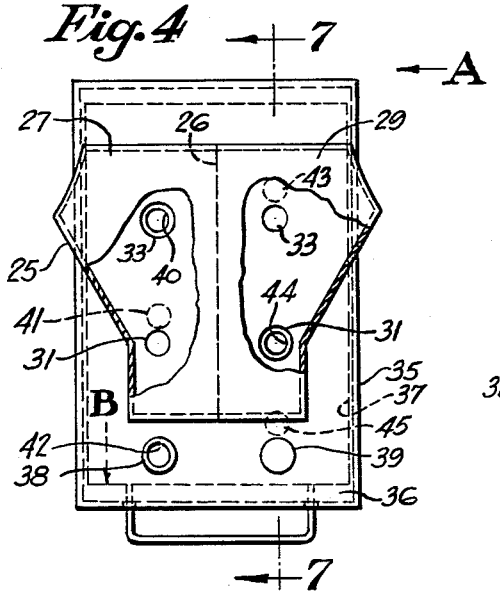
INVENTOR.
R. P. WITT
BY Richards & Geier
ATTORNEYS

United States Patent Office 3,118,656
Patented Jan. 21, 1964

3,118,656
LIGHTWEIGHT CEMENTITIOUS MATERIALS
Robert P. Witt, 6500 NW. 35th Ave., Miami, Fla.
Filed Nov. 6, 1961, Ser. No. 150,379
3 Claims. (Cl. 259—145)

This invention relates to a method of and apparatus for the batch mixing and continuous delivery of lightweight cellular cementitious materials.

The method of mixing a liquid foam or a gas with lightweight aggregates and Portland cement to produce a lightweight cellular concrete is old and well known in the art. However, known prior art methods of job or batch mixing this type of material are beset with shortcomings which contribute to a lack of uniformity in the finished material. Usually, the foam or lightweight aggregate, or both, break down causing some separation of the material into its components with consequent loss in yield and impairment of the quality of the finished material from the standpoint of strength and density.

It is, therefore, the primary object of the present invention to provide a method of batch mixing a uniformly blended homogeneous mixture of foam, water, lightweight aggregate and Portland cement to form a lightweight cellular concrete.

It is another object of the present invention to provide a method of batch mixing a lightweight cellular concrete which prevents breakdown of the foam or separation during mixing of the aggregates comprising the mixture.

Still another object is to utilize agitation and recirculation of the component materials during batch mixing to achieve uniform quality and consistency in the finished concrete.

A further object of the present invention is to provide improved apparatus for batch mixing lightweight cellular concrete.

Other objects of the present invention will become apparent in the course of the following specification.

The achievement of the aforementioned objectives of the present invention contemplates the provision of an apparatus in which two tank-like mixing chambers are supported along side each other on a suitable frame structure which, in turn, may itself be supported on wheels or tracks for easy transportation. A discharge pump and a recirculating pump are also mounted on the frame structure below the mixing chambers. A manifold extends between the two mixing chambers at the bottom, and communicates with the interior of each mixing chamber, the manifold having two separate compartments, one for each mixing chamber. A two position transfer valve is supported beneath the manifold. Various piping is used to interconnect the mixing chambers, manifold, transfer valve, recirculation pump and discharge pump so that in one position of the transfer valve, the contents of the mixing chamber are discharged to the recirculating pump, the pump, in turn, discharging back into that mixing chamber through a nozzle in the top of the chamber. While the first chamber is undergoing a recirculation cycle, the second chamber is connected to the discharge pump which pumps through a discharge line to a selected location away from the apparatus. Each mixing chamber has an agitator located near the bottom, the agitator being used to agitate the concrete mixure. In use, one chamber is filled with the component materials used to make the concrete. That chamber is connected for recirculation so that agitation and recirculation of the material through the nozzle and discharging back into the chamber, cause through mixing of the concrete. During this time the other chamber is connected for discharge. When the concrete in the first chamber is properly mixed, the transfer valve is shifted to the other position causing the first chamber to be connected for discharge and the second chamber for recirculation. The cycle is then continued for mixing in the second chamber until the contents therein are ready for discharge. In this way a continuous supply of concrete can be mixed and discharged in first the one and then the other mixing chamber and so on. The drive for the pumps and agitators is provided by a gasoline engine mounted on the frame structure. Clutches for connecting and disconnecting the drive, and controls for shifting the cycle from one to the other mixing chamber are also provided.

The invention will appear more clearly from the following detailed description when taken in conjunction with the accompanying drawings showing, by way of example, a preferred embodiment of the inventive concept.

In the drawings:

FIGURE 3 is a partial view in perspective of the apparatus showing the piping arrangement at the under side of the transfer valve.

FIGURE 4 is a top plan view in enlarged scale of the manifold and transfer valve used in the apparatus of the present invention, portions of the top of the manifold being broken away to show the openings in the bottom of the manifold;

FIGURE 5 is a front elevational view of FIGURE 4;

FIGURE 6 is a side elevational view of FIGURE 4 looking in the direction of arrow A of FIGURE 4; and FIGURE 7 is a sectional view of the manifold and transfer valve taken along line 7—7 of FIGURE 4.

FIGURE 8 illustrates diagrammatically the flow diagram of the concrete mixing apparatus of the present invention.

Throughout the specification, like reference numerals are used to indicate like parts.

Figure 1:
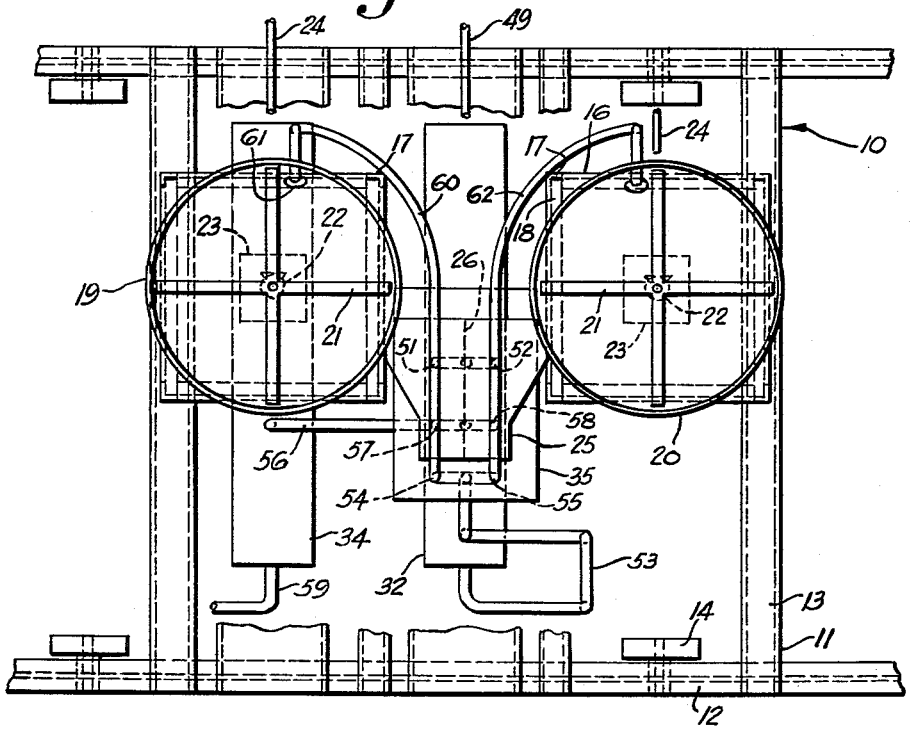
FIGURE 1 is a plan view of a concrete mixing apparatus constructed in accordance with the principles of the present invention.
Figure 2:
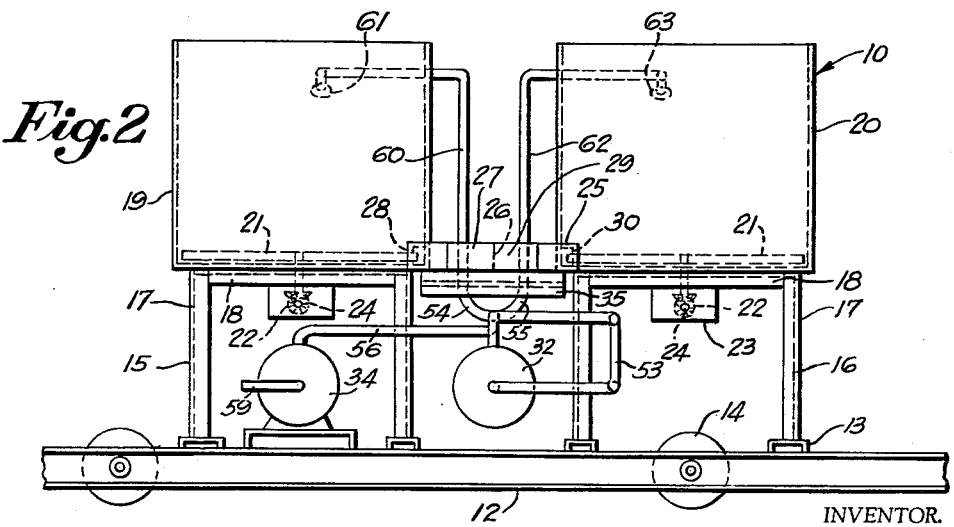
FIGURE 2 is a front elevational view of the apparatus shown in FIGURE 1.

The apparatus 10 of the present invention includes a frame structure 11 which comprises a pair of parallel spaced I-beams 12, and a number of channel members 13 connected to and extending between the I-beams to form a rugged supporting structure for the various later described components of the apparatus 10. In connection with the frame structure 11, it can be equipped to ride on wheels 14 to make the entire apparatus easily transported from one job site to another.

The frame structure 11 is provided with two sub-frame structures 15 and 16, the latter comprising a number of vertically arranged angle standards 17 and a number of horizontally arranged angles 18 connecting the standards 17. The sub-frame structures 15 and 16, respectively, constitute supports for a pair of mixing chambers 19 and 20 in which the actual mixing of the concrete material takes place. Each of the mixing chambers 19 and 20 is cylindrical in shape having an open top and a closed bottom.

Each mixing chamber is provided with a four-bladed agitator 21 which in operation is driven by right angle drive gearing 22 carried in a gear box 23 mounted beneath the center of each mixing chamber 19 and 20. The gearing 22 in each gear box 23 is in turn driven by a drive shaft 24 powered through appropriate drive from a gasoline engine (not shown) carried on the frame structure 11. Each agitator 21 is positioned just above the bottom of its associated mixing chamber and in operation rotates through the mass of concrete mixture to agitate it and effect more complete and uniform mixing of the materials.

A manifold 25 is connected to and extends between the sides of mixing chambers 19 and 20 at the bottom. A division plate 26 extends in the center of the manifold 25 dividing it into one compartment 27 which communicates with the interior of mixing chamber 19 through an opening 28 in the side thereof, and a second separate compartment 29 which communicates with mixing chamber 20 through an opening 30 in the side thereof. Each compartment 27 and 29 of the manifold has a pair of openings at the bottom, one opening 31 of each pair aligns its associated compartment and hence its associated mixing chamber, to the later described discharge pump 34; the other opening 33 of each pair aligns its associated compartment with the later described recirculating pump 32. Flow from the mixing chamber through the manifold will be through one (31) or the other (33) of the openings of each pair of openings depending on the position of the after described transfer valve 35 (FIG. 4).

The transfer valve 35 comprises a casing 36 connected to the bottom of the manifold 25, and a two position slide plate 37 (mounted within the casing). The top of the transfer valve casing has a pair of openings 38 and 39 through which recirculated concrete will pass to one or the other of the mixing chambers 19 and 20 depending on the position of the transfer valve. A similar pair of openings 38' and 39' aligned with openings 38 and 39, respectively, are contained in the bottom of the transfer valve casing. In addition, the top and bottom of the casing 36 contains aligned openings positioned beneath the openings 31 and 33 of manifold 25. The slide plate 37 also contains a number of openings which are arranged in two rows, one row on either side of the division plate 26 in manifold 25. The openings in one row are staggered with respect to openings in the other row so that when the slide plate is in one position, the openings in the manifold and transfer valve align to connect one mixing chamber 19 with the recirculating pump 32 and the other mixing chamber 20 with the discharge pump 34.

Referring in greater detail to FIGURE 4, the slide plate 37 is shown in its first position. In this position an opening 40 therein aligns with the opening 33 in manifold compartment 27, thus connecting mixing chamber 19 with the recirculating pump 32. Opening 41 in slide plate 37 is out of position with the opening 31 in the manifold compartment 27. Thus, flow from mixing chamber 19 to the discharge pump 34 is prevented. At the same time opening 42 in slide plate 37 aligns with the openings 38 and 38' in valve casing 36 so that concrete pumped from the recirculating pump 32 can flow back into mixing chamber 19 in a manner which will be more fully explained later on. With the slide plate still in the first position, the opening 43 therein is out of position with respect to the opening 33 in manifold compartment 29. Thus, flow from mixing chamber 20 to the recirculating pump 32 is prevented. However, opening 44 in slide plate 37 aligns with the opening 31 in compartment 29 so that the mixing chamber 20 is connected to the discharge pump 34. At the same time opening 45 in slide plate 37 is out of alignment with openings 39 and 39' in the valve casing 36 so that flow from the recirculating pump 32 which is taking suction from mixing chamber 19, cannot be pumped into mixing chamber 20.

On the other hand, by moving slide plate 37 forwardly in the direction of arrow B (FIG. 4), the transfer valve is moved to its second position and the reverse of the above takes place causing mixing chamber 19 to be switched to discharge, and mixing chamber 20 to recirculation operation. Slide plate 37 may be supported on blocks 46 which are connected to the bottom of transfer valve casing 36. Short pipe sections, or nipple pieces 47 and 48 are firmly connected to the top and bottom, respectively, of the valve casing 36 for the purpose of directing flow through the transfer valve 35.

A recirculating pump 32 is firmly supported on frame structure 11 in a position beneath transfer valve 35. In operation recirculating pump 32 is driven by shaft 49 which is powered by a gasoline engine (not shown) with appropriate controls and clutching being provided. A suction connection 50 connects recirculating pump 32 with transfer valve 35 through branches 51 and 52 for providing for flow from mixing chambers 19 or 20, depending on the position of the transfer valve. Discharge from recirculating pump 32 is through piping 53 located at one end of the pump. The piping 53 opens out into two branches 54 and 55 which are connected to the bottom of transfer valve 35 under the openings 38' and 39', respectively. In this manner discharge from recirculating pump 32 can be made to either mixing chamber 19 or mixing chamber 20 depending again on the position of the transfer valve.

A discharge pump 34 is also firmly supported on frame structure 11 and is driven in the same manner as recirculating pump 32. Suction for discharge pump 34 is from mixing chamber 19 or 20 and through the appropriate manifold compartment depending on the position of transfer valve 35. Suction piping 56 connects the transfer valve 35 and discharge pump 34, the piping 56 having a branch 57 for flow from mixing chamber 19 and a branch 58 for flow from mixing chamber 20. A discharge line 59 emanates from one end of the discharge pump 34 and is used to direct flow of concrete away from the apparatus to the area of the work site.

A length of pipe 60 is firmly connected to the top of transfer valve 35 over the opening 38 therein, the other end of the pipe 60 being connected to a wide-mouthed nozzle 61 positioned inside mixing chamber 19 near the top. In this manner, concrete pumped from the recirculating pump 32 will (depending on setting of valve 35) flow back into mixing chamber 19 to aid in effecting proper mixture of the concrete. Similarly, a length of pipe 62 is firmly connected to transfer valve 35 over the opening 39 therein, the pipe 62 being connected at the other end to a wide mouth nozzle 63 in mixing chamber 20.

In use the apparatus of the present invention may be used for batch mixing various types of lightweight cellular concrete. Of course, the particular type of concrete mixed will depend on the use intended. As, for example, it may be desired to prepare a lightweight fill for insulating purposes, or then again it may be desired to prepare a lightweight structural concrete. In either case the end product mixed will be determined by the type and quantity of component material used. However, the same method and apparatus is used in both uses to achieve uniformity of mixture and high level of yield.

It will for purposes of example in describing the operation of the apparatus of the present invention be assumed that a lightweight structural concrete is to be batch mixed. A gasoline engine (not shown) for driving the agitators and pumps is placed in operation. For the purposes of controlling the various cycles, any selected timer control device of a well known type may be employed. In this way the shifting of the mix cycle alternately from one to the other mixing chamber may be effected. Of course, the length of the various cycles will be determined by the type of concrete being mixed and for that reason, the cyclic sequence will be predetermined and set into the control mechanism. A mechanically operated clutch (not shown) is engaged to the shafts 24 powering the agitators 21 in mixing chambers 19 and 20. Clutches (not shown) are also engaged to supply power to the shafts 49 powering the recirculating pump 32 and the discharge pump 34. It is desirable that the power to the agitators be through variable speed drives. In this manner the speed of the agitators 21 can be controlled higher during recirculation than during discharge. At the same time, as the agitators 21 begin to rotate, a control device (not shown) moves the transfer valve slide plate 37 to the position shown in FIGURE 4. For the latter purpose, the control device may be a pneumatically operated device actuated by the timer. This movement of slide plate 37 places the mixing chamber 19 on a recirculating cycle and the mixing chamber 20 on a discharge cycle. A predetermined quantity of water and detergent are now added to mixing chamber 19. The water and detergent are thoroughly mixed by the action of agitator 21 in mixing chamber 19 to form a foam. For this purpose the agitator in chamber 19 operates at a speed approximately twice that of the agitator in mixing chamber 20 which is on a discharge cycle. Of course, the water and detergent are also being continuously recirculated through recirculating pump 32 and back into mixing chamber 19 by way of the wide mouth nozzle 61. This recirculation further enhances the formation of the foam. After formation of the foam, a lightweight aggregate such as perlite, etc., is added, and this mixture is blended together by the combination of recirculation and high speed agitation for a predetermined period of time. A predetermined quantity of Portland cement is then added to the mixture and the resultant slurry is recirculated and agitated for a predetermined period of time to form a homogeneous concrete of uniform consistency and blend. Since the batch of concrete mixed chamber 19 is now ready for discharge and use, the control mechanism shifts transfer valve slide plate 37 to its second position. This causes opening 33 in manifold compartment 27 and opening 38 in transfer valve 35 to be closed taking mixing chamber 19 off recirculating cycle and connecting it to the discharge pump 34, since opening 41 in the slide plate is now aligned with opening 31 in manifold compartment 27. The contents of mixing chamber 19 will then be pumped out through discharge line 59 to the work site. The last-mentioned movement of slide plate 37 also results in shifting mixing chamber 20 to a recirculating cycle, since opening 43 therein aligns with opening 33 in manifold compartment 29, and opening 45 aligns with opening 39 in the transfer valve, the openings 43 and 45 being used, respectively, to connect mixing chamber 20 to and from recirculating pump 32. The same action results in opening 31 leading to discharge pump 34, being closed. The addition of water, detergent, aggregate and Portland cement to mixing chamber 20 now takes place in the same manner as previously described. After the slurry is mixed in chamber 20, the control will shift slide plate 37 back to its first position putting chamber 20 on discharge and chamber 19 on recirculation. The cycle then continues to be switched from one mixing chamber to the other as long as a continuous supply of concrete is needed.

While there is above disclosed but one embodiment of the concrete mixing apparatus, it is possible to produce still other embodiments without departing from the inventive concept herein disclosed.

What is claimed is:

1. The method of batch mixing a lightweight cellular concrete having uniform consistency which comprises the steps of mixing together in a chamber a predetermined quantity of water and a detergent; simultaneously agitating and recirculating the water-detergent mixture within said chamber to form an aqueous foam; adding a predetermined quantity of a lightweight aggregate to the aqueous foam and then simultaneously agitating and recirculating the aqueous foam-aggregate mixture within said chamber; adding a predetermined quantity of Portland cement to the aqueous foam-aggregate mixture; and then simultaneously agitating and recirculating the resulting mixture within said chamber until a concrete slurry of uniform consistency is formed.

2. Apparatus for the continuous batch mixing and distribution of light weight concrete, said apparatus comprising: an arrangement of interconnected structural beam members constituting a support frame; a pair of mixing chambers mounted on said support frame in side by side relation, each of said mixing chambers being open at the top; agitator means carried in each mixing chamber; a manifold extending between and connected to said mixing chambers at the bottom, said manifold having a division plate extending therethrough separating it into two compartments, one of said compartments being in communication with the interior of one of said mixing chambers, the other of said compartments being in communication with the interior of the other of said mixing chambers; a recirculating pump having suction and discharge connections mounted on said support frame; a discharge pump having suction and discharge connections mounted on said support frame alongside said recirculating pump; nozzles firmly connected to the inside of each mixing chamber near the top; conduit means interconnecting the interior of each of said manifold compartments with the suction connection of said recirculating pump; conduit means interconnecting the interior of each of said manifold compartments with the suction connection of said discharge pump; conduit means interconnecting the discharge connection of said recirculating pump with the nozzles in each of said mixing chamber; a discharge conduit connected to the discharge connection of said discharge pump; and dual position control means operatively connected with each of said conduit means and adapted in a first operative position to permit flow from one of said mixing chambers to said recirculating pump and back to said mixing chamber through the nozzle therein, and to direct flow from the other of said mixing chambers to said discharge pump, said dual position control means in its other operative position being adapted to direct flow from the other one of said mixing chambers to said recirculating pump and back to said other mixing chamber through the nozzle therein, and to direct flow from the first-mentioned mixing chamber to said discharge pump.

3. Apparatus for the continuous batch mixing and distribution of light weight concrete, said apparatus comprising: an arrangement of interconnected structural beam members constituting a support frame; a pair of cylindrically-shaped mixing chambers mounted upright on said support frame in side by side relation, each of said mixing chambers being open at the top; a plural bladed agitator rotatably supported in the bottom of each mixing chamber; means for rotating each agitator in a plane parallel to the bottom of the mixing chamber; nozzles firmly connected to the inside of each mixing chamber near the top; a manifold extending between and connected to said mixing chambers at the bottom, said manifold having a division plate extending therethrough separating it into two compartments one of said compartments being in communication with the interior of one of said mixing chambers, the other of said compartments being in communication with the interior of the other of said mixing chambers, each of said manifold compartments having a pair of openings in the bottom thereof; a valve casing having spaced upper and lower walls firmly connected to the bottom of said manifold, said valve casing further having suction openings in said upper and lower walls aligned with the openings in the bottom of each manifold compartment, said valve casing upper and lower walls further having aligned recirculation openings in front of each manifold compartment; a recirculating pump having suction and discharge connections mounted on said support frame; conduit means connected with the suction connection of said recirculating pump and with one of the suction openings in said valve casing lower wall under each manifold compartment; conduit means connected with the discharge connection of said recirculating pump and with the recirculation openings in the lower wall of said valve casing; conduit means connected with the recirculation openings in the upper wall of said valve casing and with the nozzles in each of said mixing chambers; a discharge pump having suction and discharge connections mounted on said support frame alongside said recirculating pump; conduit means connected with the suction connections of said discharge pump and with the other of said suction openings in said valve casing lower wall under each manifold compartment; and a dual-position slide plate carried in said valve casing, said slide plate having openings therein which in a first operative position of said slide plate align with one of the suction openings in said valve casing connected with said recirculating pump, one of the suction openings in said valve casing connected with said discharge pump and the recirculation openings in said valve casing in front of one of said manifold compartments, said slide plate having other openings which in a second operative position of said slide plate align with the remaining suction openings and recirculation openings in said valve casing.

References Cited in the file of this patent
UNITED STATES PATENTS

| | | |
|---|---|---|
| 2,660,415 | Hawes | Nov. 24, 1953 |
| 3,017,164 | Ayers et al. | Jan. 16, 1962 |